Oct. 13, 1970    J. E. LEONARD, JR., ET AL    3,533,258
APPARATUS FOR ROLL FORMING WORKPIECES
Original Filed Feb. 27, 1967    9 Sheets-Sheet 5

INVENTORS
MARTIN WENGER, JR.
JOHN LEONARD, JR.

BY Strauch, Nolan.
Neale, Nies & Kurz
ATTORNEYS

Oct. 13, 1970  J. E. LEONARD, JR., ET AL  3,533,258
APPARATUS FOR ROLL FORMING WORKPIECES
Original Filed Feb. 27, 1967  9 Sheets-Sheet 9

INVENTORS
MARTIN WENGER, JR.
JOHN LEONARD, JR.

BY *Strauch, Nolan, Neale, Nies & Kurz*

ATTORNEYS

United States Patent Office 3,533,258
Patented Oct. 13, 1970

3,533,258
APPARATUS FOR ROLL FORMING WORKPIECES
John E. Leonard, Jr., Fayetteville, and Martin S. Wenger, Jr., Chambersburg, Pa., assignors to Teledyne Mid-American Corporation, a corporation of Delaware
Continuation of application Ser. No. 618,750, Feb. 27, 1967. This application Mar. 21, 1969, Ser. No. 809,365
Int. Cl. B21h 5/00, 9/00
U.S. Cl. 72—108                                    11 Claims

ABSTRACT OF THE DISCLOSURE

Apparatus for roll forming workpieces, particularly finish rolling gears, the apparatus having a pair of rotating dies, one rotating about a fixed axis and the other rotating about a laterally displaceable axis. The workpieces are delivered to the rolling station by a turret having a number of mandrels, one of which is positioned at the rolling station while another is positioned at a loading station so that the turret is loaded and unloaded during the rolling operation. The workpiece is positively rotated prior to its engagement by the dies. The workpiece is held against axial movement but is shifted with the displaceable die by a lever system connected to the laterally displaceable die, the shifting movement of the workpiece less than the displacement of the die.

RELATED APPLICATION

This application is a continuation of application Ser. No. 618,750 filed Feb. 27, 1967, and now abandoned, for Apparauts for Roll Forming Workpieces.

Application Ser. No. 607,455 filed Jan. 5, 1967 and now abandoned, discloses and claims a rolling die useful in the subject rolling apparatus.

BACKGROUND OF THE INVENTION

This invention relates to apparatus for roll forming workpieces and has particular application to the formation of parts, such as automotive transmission gears, which must meet unusually exacting standards for dimensional accuracy and finish.

In the past automatic transmission gears and gears meeting similar standards for finish and dimensional accuracy have been manufactured by first hobbing a cylindrical blank to form the gear to a configuration closely approximating the final desired form. The gear is then finished by shaving. While this process provides gears of adequate quality it is expensive and relatively slow. In a typical case the hobbing operating can be performed with first quality equipment in about one minute. The final shaving operation usually requires about 25 seconds or more depending on the size of the gear. The shaving tools, which are expensive, require sharpening after a production run of as few as about 10,000 parts under normal operating conditions. In typical use they can be sharpened five times before they must be discarded. The sharpening process itself is relatively expensive and time consuming and necessitates the use of alternate equipment to avoid unacceptable down time.

There are other limitations on the hobbing-shaving technique of gear production. For example, even with the best equipment the hobbed blank is frequently formed with lead error which is beyond the capacity of the shaving equipment to correct. Typically, if the hobbed blank is produced with a lead error in excess of several thousandths per inch it must be scrapped. Experience has demonstrated that because of the limited ability of the shaver to correct lead error, a rejection rate of 15 per cent is not unusual.

Also, the shaving machines are quite bulky and when used in numbers sufficient to provide the required production capacity they occupy an excessive amount of floor space, thus further increasing the cost of the process.

These and other defects of the hobbing-shaving technique have inspired many efforts to provide improved processes and apparatus for the manufacture of transmission gears and gears of like high quality. Despite the availability of the resources of the automotive industry, all such efforts have been unsuccessful and the hobbing-shaving process has continued in universal use.

SUMMARY OF THE INVENTION

It is essential in the formation of gears and similar parts to close tolerances that the workpiece be positioned between the rolling dies in precise relation to the axes of the dies and the peripheral work forming ridges of the dies. The axis of the workpiece must be in a plane containing the axis of the dies and the workpiece must be positioned axially of the dies with extreme accuracy. In addition, the workpiece must occupy a position essentially midway of the dies. In rolling apparatus of the infeed type in which one roll moves toward the other during the rolling operation, the workpiece must be laterally shifted continuously during the rolling operation, the lateral displacement of the axis of the workpiece being half the lateral displacement of the axis of the movable die.

In addition to satisfying these requirements, the rolling apparatus must be capable of producing finished workpieces rapidly and automatically over relatively long periods of time without requiring replacement of parts, adjustment or other maintenance requiring the frequent or constant attendance of an operator.

The apparatus must also be capable of producing workpieces which satisfy exacting requirements for quality of finish. Thus, the mechanism for handling the workpiece must be so constructed as to avoid marking or nicking the finished workpiece. Similarly, provision must be made for engaging and disengaging the dies and the workpiece in a manner to avoid damage to the workpiece.

It is a principal purpose and object of the present invention to provide improved apparatus for roll finishing workpieces satisfying all of the foregoing requirements to a degree not heretofore achieved.

In obtaining this and other objects, the present invention provides, in an essentially conventional infeed rolling machine, a mechanism for delivering workpieces to the rolling station, for accurately supporting and positioning the workpiece at the rolling station throughout the rolling operation and for subsequently delivering workpieces to a desired point. More specifically, an important feature of the invention is a turret assembly having a plurality of mandrels spaced around its periphery, the mandrels being arranged so that while one mandrel supports the workpiece between the rolling dies, another mandrel is positioned at a loading station. The invention also provides a unique mechanism for removing a finished workpiece from the mandrel at the loading station and depositing an unfiinished workpiece on the mandrel, both actions being accomplished during the rolling operation. Thus, the time consumed in loading and unloading the turret assembly is reduced to zero.

In another important aspect, the present invention provides a mandrel support which engages a turret mandrel at the rolling station so that the workpiece is straddle supported or mounted during the rolling operation. The mandrel and mandrel support also cooperate to effect the precision positioning of the workpiece essential to successful operation of the apparatus. Provision is also made for driving the mandrel support to thereby drive the mandrel and the workpiece at a speed at which the pitch line velocities of the workpiece and the dies are essentially exactly matched to eliminate marking of the workpiece which would otherwise be occasioned by the rapid acceleration of the workpiece on initial engagement by the dies. Another important feature of the invention is a lever mechanism for laterally shifting the turret, the mandrel and mandrel support and the workpiece during the rolling operation to accommodate the infeed movement of the movable rolling die.

It is, accordingly, a more specific object of the present invention to provide improved mechanisms for transferring workpieces to and from a rolling station in an infeed rolling apparatus.

It is also an object of the present invention to provide a unique mechanism for driving the workpiece before a rolling operation and for positioning and supporting a workpiece before and during a rolling operation.

It is an additional object of the present invention to provide a novel mechanism for positively maintaining the axis of the workpiece at a point essentially midway between the axes of the rolling dies of an infeed rolling apparatus.

Additional objects and advantages will become apparent as the description proceeds.

Referring now more particularly to the drawings, all of the components of the machine are carried by a bed 20 which is sufficiently heavy and rigid to assure dimensional stability of the entire apparatus under the relatively heavy loads developed in operation. In general the apparatus is of the infeed type in which a workpiece is operated on simultaneously by a pair of opposed identical dies 22 and 24 rotating in the same direction. One of the dies is rotated about a fixed axis while the other die is rotated about an axis which is shifted laterally toward the first die during the rolling operation. The apparatus for mounting, rotating and laterally shifting one of the dies is essentially conventional and will be described herein only to the extent necessary to facilitate an understanding of the overall operation of the machine.

In the illustrated embodiment of the invention the axis of die 22 is fixed and the axis of the opposed die 24 is laterally shifted between the rolling position shown and the retracted position to permit the removal of the finished workpiece and the positioning of the next piece to be rolled. In accordance with conventional practice the die 22 is mounted on a shift 26 rotatably supported in arms 28 and 30 rigid with a support member 32 adjustably secured to a main support block 34 bolted to the bed 20.

Preferably the dies are of the type disclosed and claimed in the aforesaid application Ser. No. 607,455.

The support member 32 is adjustable with respect to its mounting block 34 to permit accurate final positioning of the axis of the shaft 26. The opposed die 24 is mounted on a shaft 36 rotatably supported in the arms of the support assembly 38 reciprocated by a piston rod forming a part of a hydraulic motor cylinder assembly indicated generally at 40 of conventional construction rigidly secured to the machine bed 20. The usual adjustments are provided to permit accurate positioning of the axis of the roll 24. The dies 22 and 24 are driven in synchronism in the same direction by a conventional drive mechanism including couplings 46, drive shaft 48, and couplings 50 connected to the output shafts of gear boxes 52 and 54 each driven by motor 56 through a belt 57. The usual universal joints are provided in the drive arrangement to accommodate an adjustment of the shaft 26 and adjustment and displacement of the shaft 36. The mechanism thus far described is of essentially conventional contruction and it is believed that its operation and construction will be apparent to those conversant with the art.

The present invention is concerned primarily with apparatus for handling the workpiece, more specifically apparatus for feeding a series of workpieces to the rolling station between the opposed dies, holding the workpiece in predetermined relation with the dies during the rolling operation, and for delivering the workpiece to any convenient storage facility.

The principal components of this apparatus are a turret assembly indicated generally at 60 for delivering workpieces to a rolling station and removing workpieces from the rolling station, a combined loader-unloader assembly indicated generally at 62 for loading and unloading the turret, and a workpiece drive and support assembly indicated generally at 64. The three major components 60, 62 and 64 are mounted on a base plate assembly 66 which is mounted for movement laterally of the machine as a function of the lateral movement of the movable die 24 in a manner described in detail below. While the lateral movement of the base plate and of the components supported thereby is relatively small, usually less than half an inch, the movement must be carefully controlled and in any displaced position it must remain in exact parallelism with its original position to assure proper positioning of the workpiece between the two rolling dies.

Figure 10:
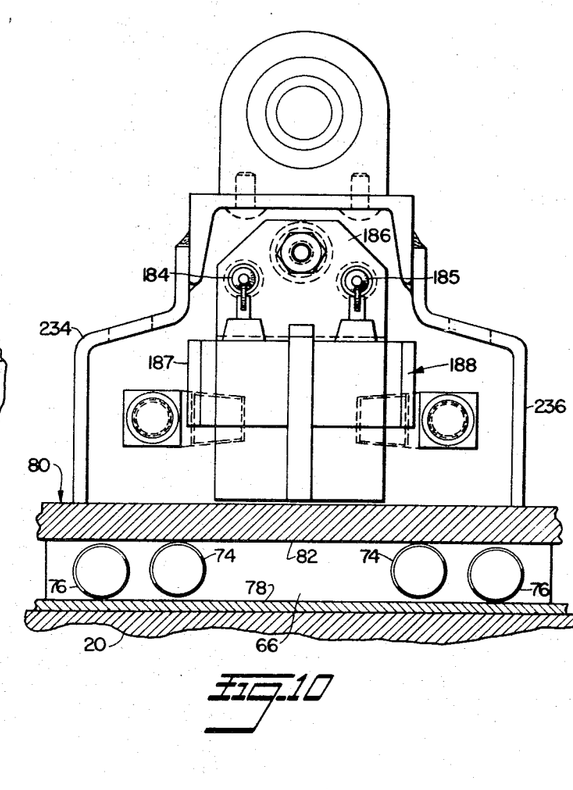
FIG. 10 is an enlarged fragmentary rear view of the apparatus looking in the direction of arrows 10—10 of FIG. 2.

To this end, the forward end of the base plate 66 is bolted and pinned to a block 67 mounted by precision bearings (not shown) on a heavy rigid shaft 68 extending transversely across the front of the machine and supported at its opposite ends in fixture support 72 rigid with the machine bed 20. At its rearward end, the base plate 66 is provided with a pair of upper rollers 74 and a pair of lower rollers 76 (FIGS. 3 and 10), the latter traveling on the lower surface 78 of a U-shaped guide assembly 80 bolted to the machine bed 20. The upper roller 74 travels along the surface 82 of the guide assembly. Thus, the lower rollers 76 support the weight of the base plate and the components carried thereby while the upper rollers prevent inadvertent lifting, tilting or twisting of the rear of the base plate.

It will be appreciated that during the rolling operation as the movable die 24 is shifted toward the fixed axis die 22 the center of the workpiece must also shift in the same direction. However, the displacement of the workpiece axis will be half the displacement of the axis of the movable die 24. In prior machines of this general type, the workpiece has been supported on a fixture which is freely laterally movable and the workpiece is shifted laterally during the rolling operation directly by the lateral forces developed by the rolls. For precision work, however, for which the apparatus of the subject invention has been specifically developed, it is desirable to avoid lateral loading of the workpiece with the attendant risk of marring the workpiece or disturbing the precise alignment of the workpiece.

In accordance with the present invention, provision is made for positively laterally shifting the workpiece during the rolling operation independently of the action of the rolls. For this purpose the unique transverse motion transmitting mechanism has been provided which will now be described with particular reference to FIGS. 2 and 7.

Figure 2:
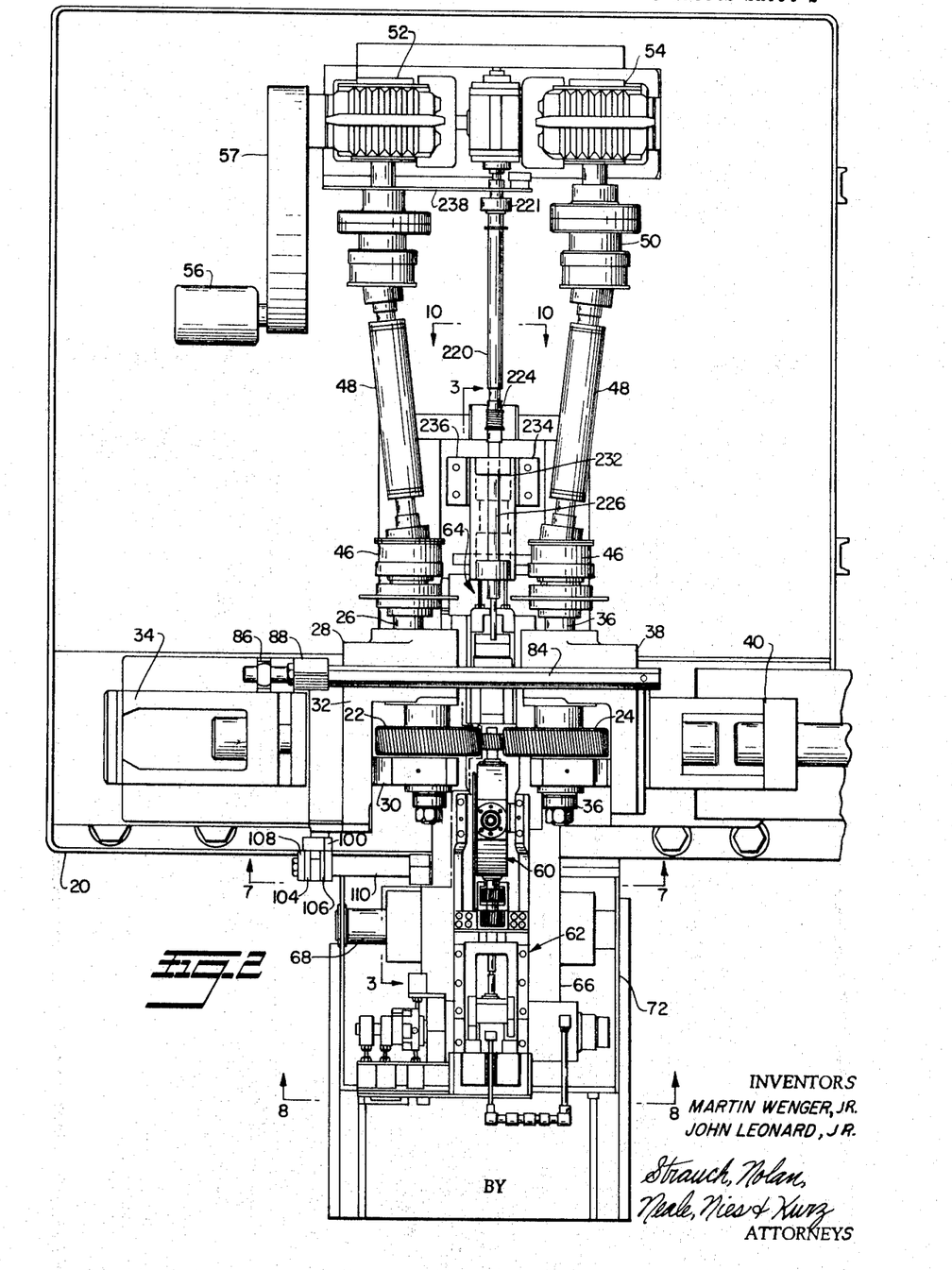
FIG. 2 is a top plan view of the apparatus of FIG. 1.
Figure 7:
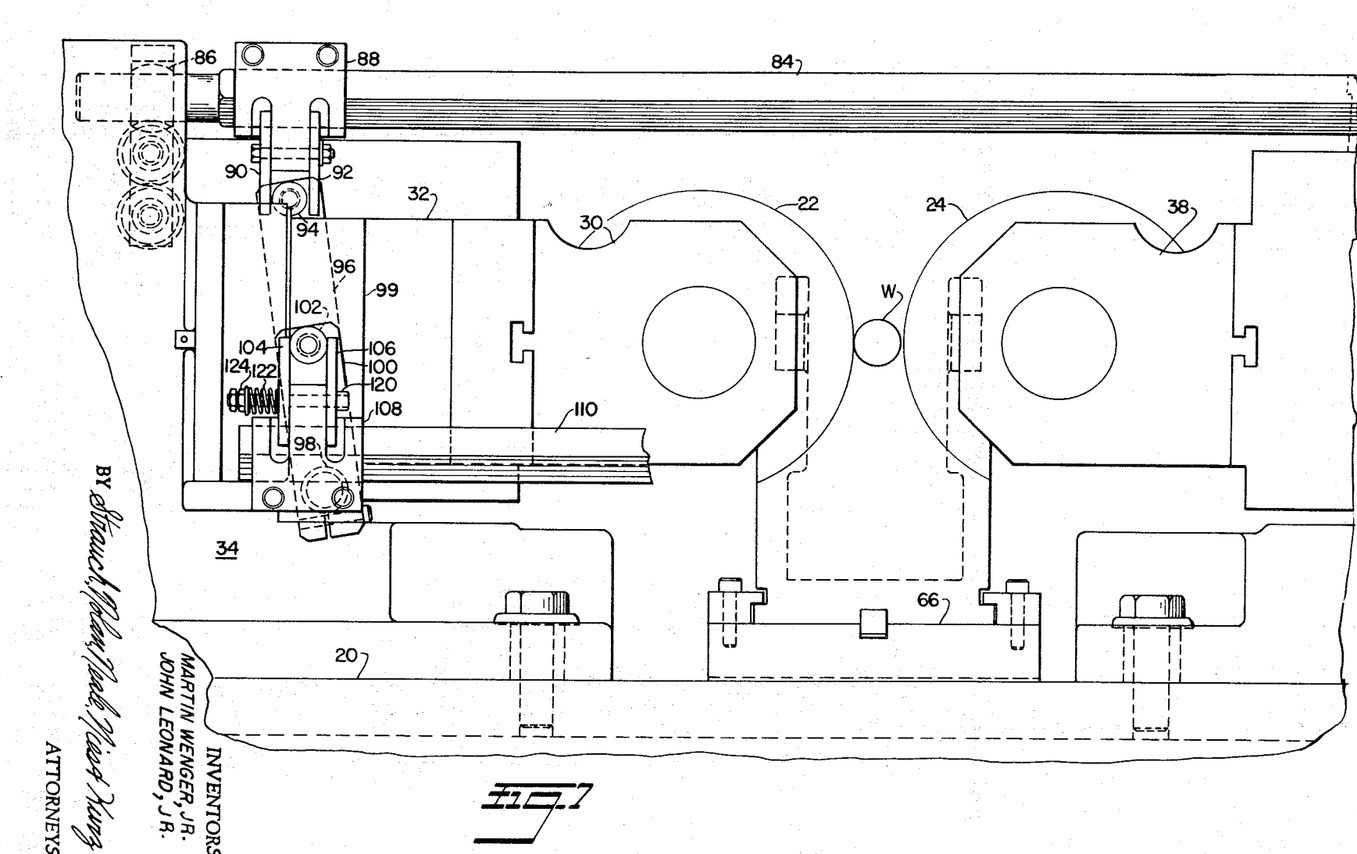
FIG. 7 is a vertical fragmentary section taken along line 7—7 of FIG. 2 illustrating details of the mechanism for shifting the workpiece laterally during the rolling operation, the turret assembly and other associated parts being removed for purposes of illustration.
Figure 8:
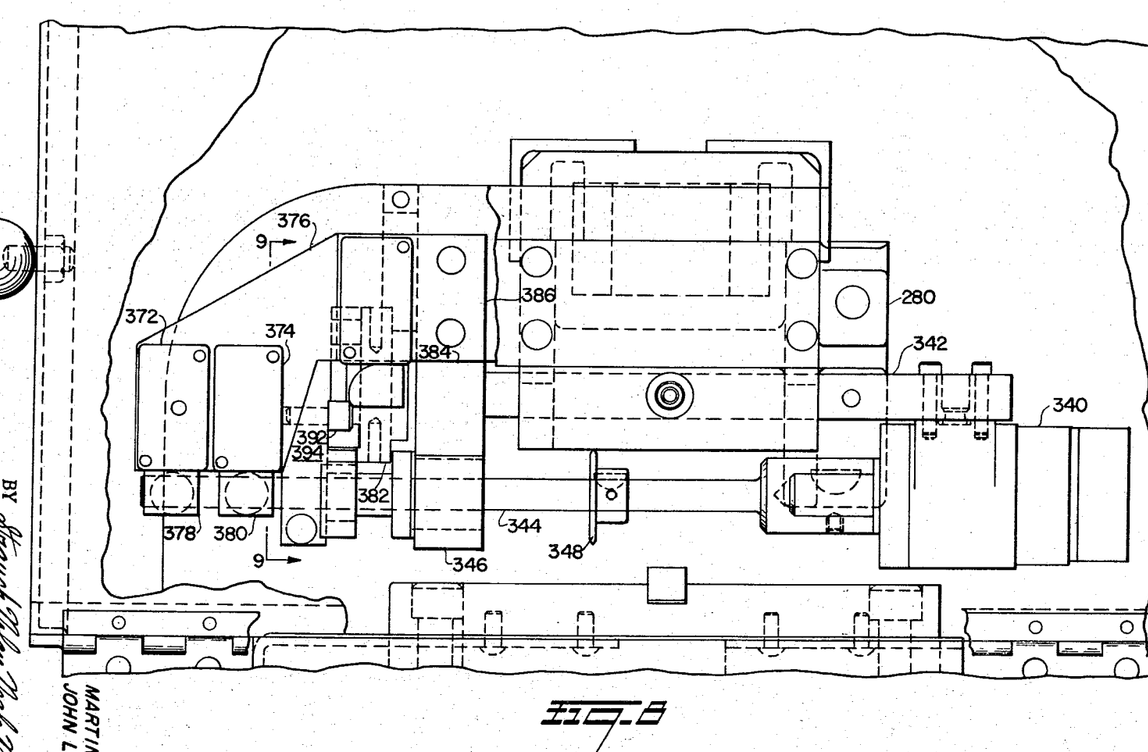
FIG. 8 is an enlarged fragmentary front view of the mechanism looking in the direction of the arrows 8—8 of FIG. 2.
Figure 9:
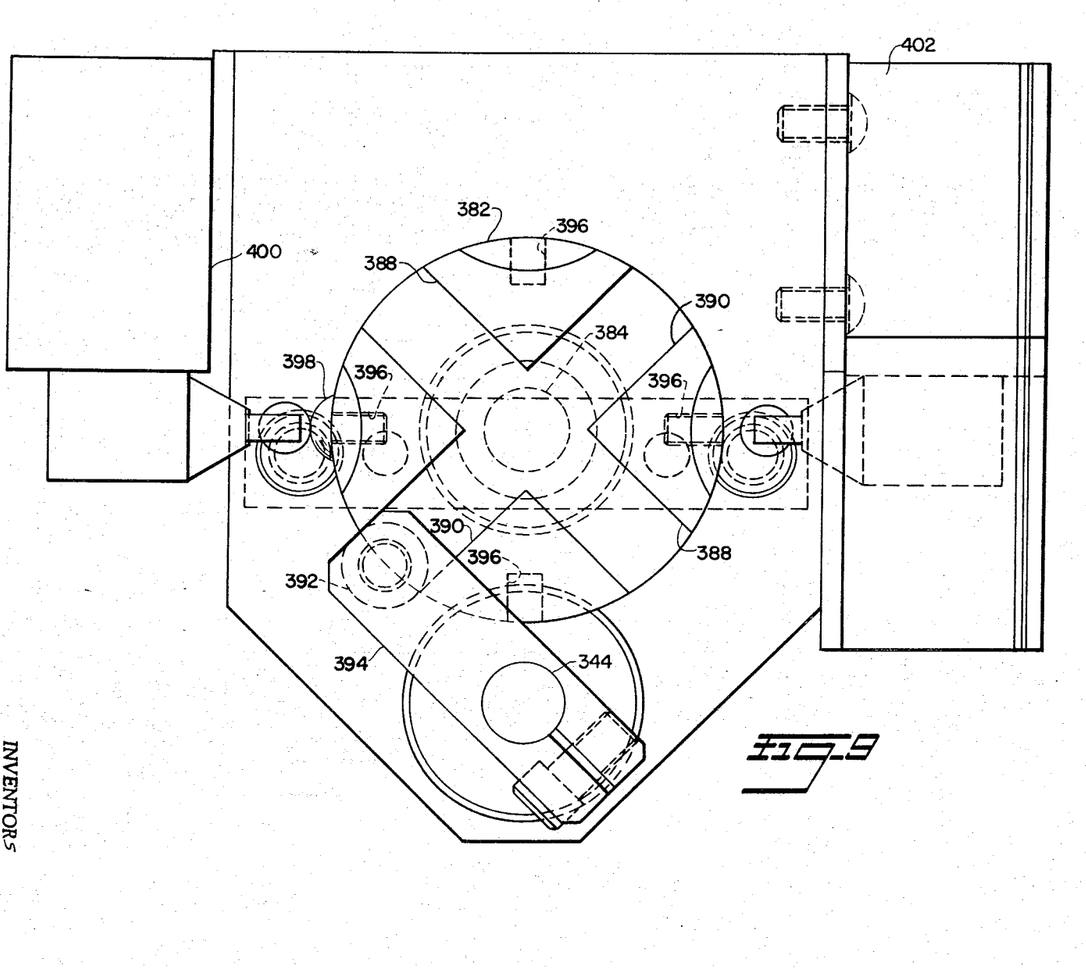
FIG. 9 is an enlarged vertical fragmentary section taken along line 9—9 of FIG. 8.

This mechanism includes an upper rod 84 having one end rigidly secured to the support member 40 for the die 24. The rod 84 thus moves with the die 24. An extension of the opposite end of the rod 84 projects freely through a pivot bearing assembly 86 carried by the fixed main support member 34 for the die 22. Adjustably secured to the rod 84 adjacent one end is a mounting block 88 carrying a pair of downwardly projecting spaced plates 90 and 92. Received with a close clearance fit between the plates 90 and 92 is a roller 94 carried by the upper end of a lever 96, the lower end of which is pinned to a pivot shaft 98 rotatably supported in plate 99 carried by the die mounting member 34. Pinned to the end of the shaft 98 opposite the lever 96 is a second shorter lever 100 parallel with the lever 96. At its upper end the lever 100 carries a roller 102 positioned between a pair of opposed plates 104 and 106 carried by a mounting block 108 adjustably secured to one end of a lower motion transmitting rod 110, the opposite end of which is secured to a fitting 112 carried by the base plate 66.

The distance between the axis of shaft 98 and the axis of roller 102 is exactly one-half the distance between the axis of shaft 98 and the axis of roller 94. Accordingly, any displacement of the roll 24 and the upper shaft 84 will be accompanied by a displacement in the same direction of the lower shaft 110 and the work supporting turret, the displacement of the turret being exactly one-half the displacement of the roll 24.

A yieldable connection is provided in the motion transmitting system to prevent overloading the workpiece in the event of improper engagement between the workpiece and the rolls 22 or 24. For this purpose the blocks 104 and 106 are yieldably secured to the mounting block 108 by a headed bolt 120 extending through the plate 106, the block 108 and the plate 104. A spring 122 is compressed between the outer face of the plate 104 and nuts 124 threaded onto the projecting end of the bolt 120. Accordingly, if the upper rod 84 moves to the right as viewed in FIG. 7 and the motion of the lower rod 110 is obstructed the plate 106 will move away from the block 108 thus permitting relative movement between the two shafts 84 and 110. Similarly, if the rod 84 is moved to the left while similar motion of the rod 110 is obstructed, plate 104 will shift away from the block 108 to permit the necessary relative motion between the rods. It will be noted that in normal operation both plates 106 and 104 are held firmly against the adjacent surfaces of the support block 108 and under all circumstances one of the plates is so held. This arrangement permits the necessary safety factor to be introduced into the system without simultaneously introducing any undesirable looseness which would prevent the necessary accuracy of movement of the parts. The motion transmitting mechanism is initially adjusted so that the workpiece will be contacted essentially simultaneously by the two opposed rolls.

Figure 3:
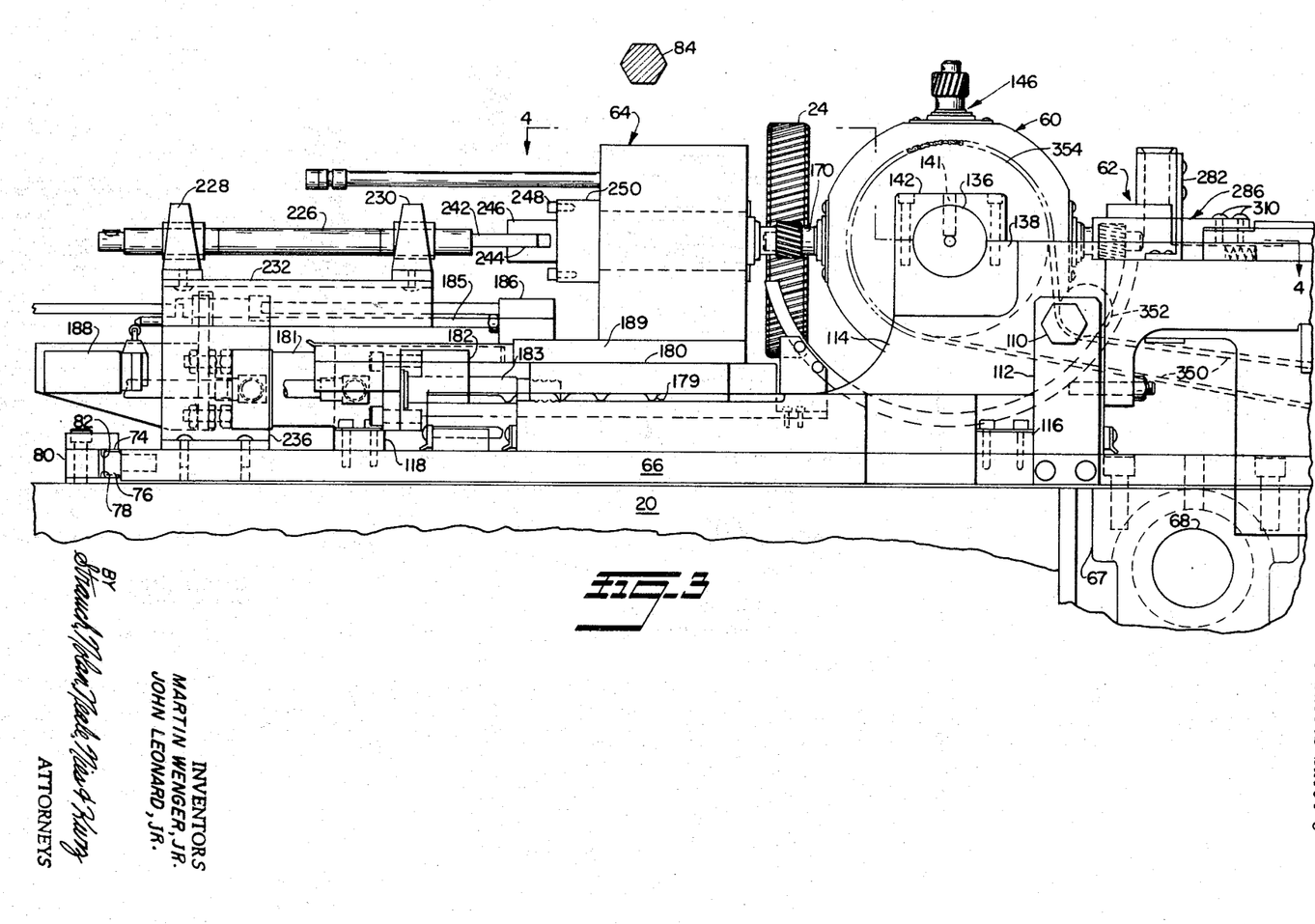
FIG. 3 is an enlarged fragmentary vertical section taken along line 3—3 of FIG. 2.
Figure 4:
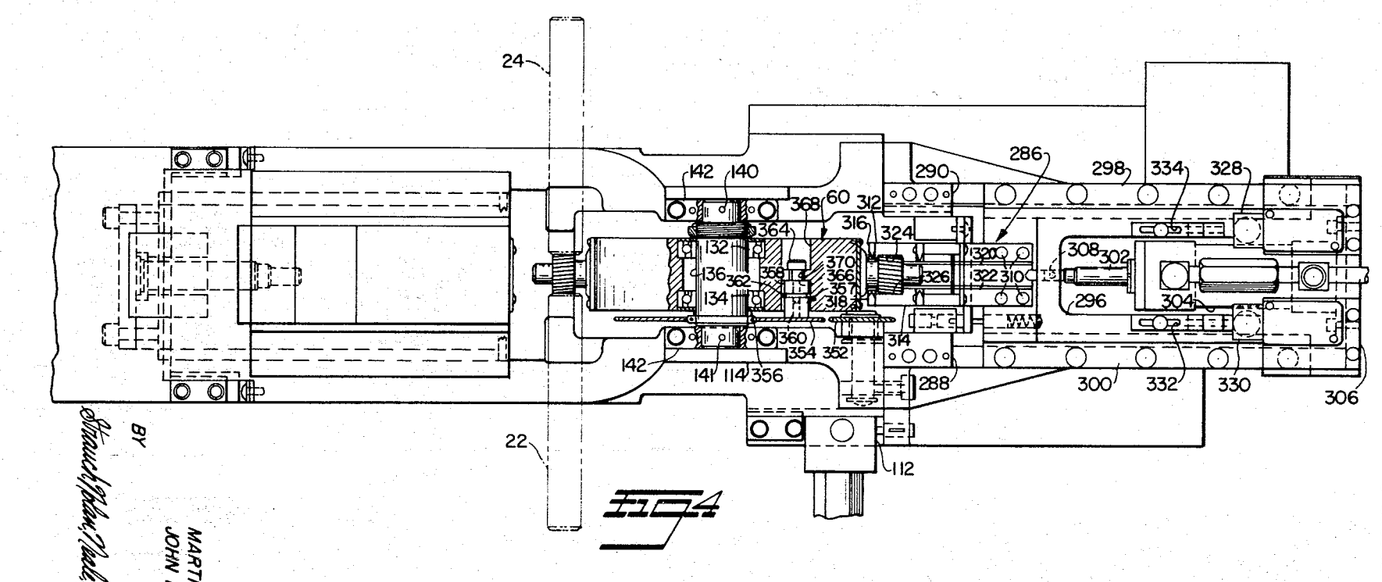
FIG. 4 is a horizontal section taken along line 4—4 of FIG. 3.
Figures 5A, 6:
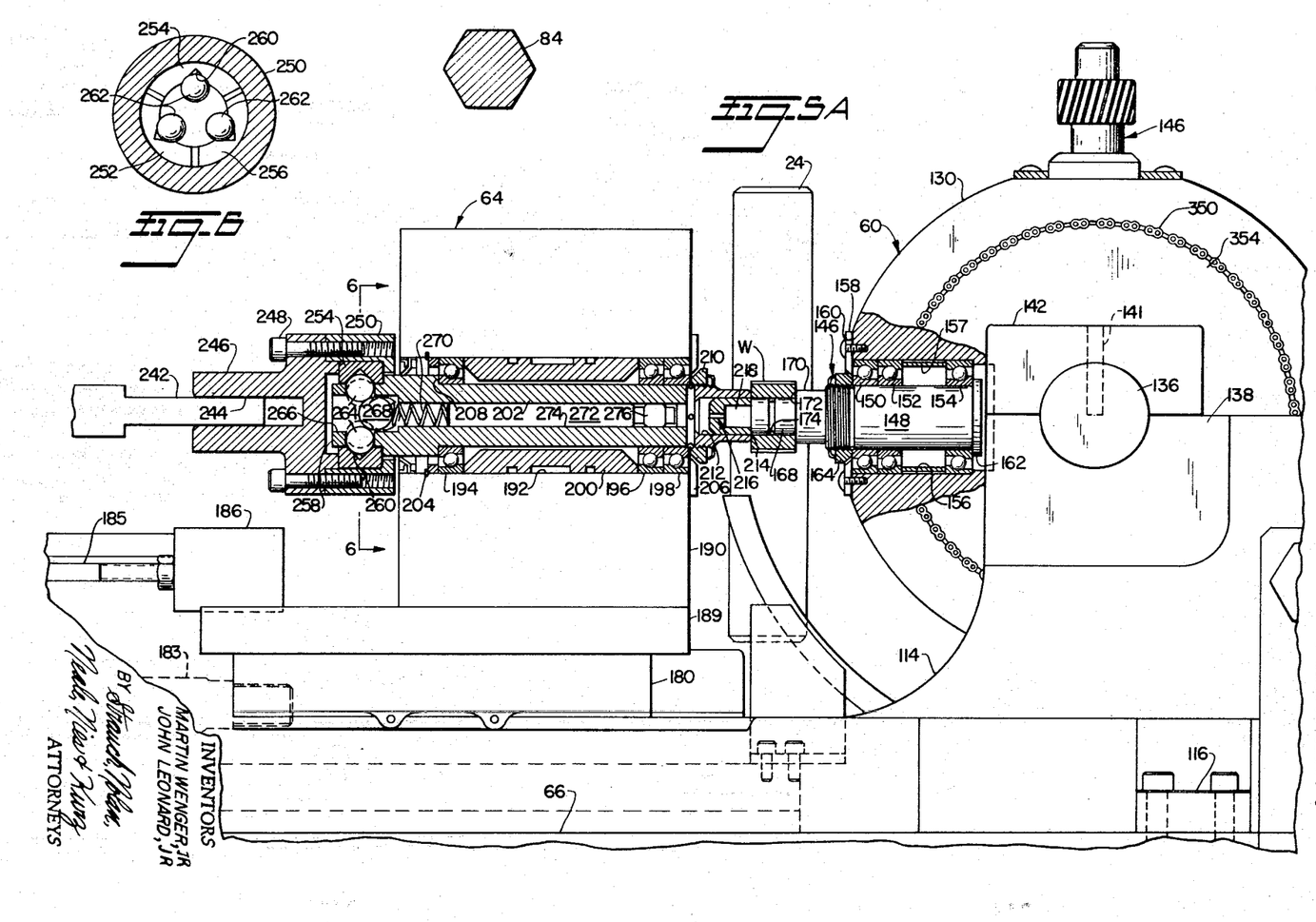
FIG. 5A is a further enlarged view of a portion of the assembly shown in FIG. 3 with parts in section to show interior details.
FIG. 6 is a transverse section taken along line 6—6 of FIG. 5A illustrating the construction of a clutch assembly incorporated in the workpiece drive mechanism.

With particular reference to FIGS. 3, 4 and 5A the turret assembly comprises an essentially cylindrical body member 130 supported by pre-loaded precision bearings 132 and 134 on a fixed shaft 136. At its opposite ends the shaft 136 is rigidly supported in pillow blocks, the lower halves 138 of which are formed integrally with the main turret casting 114. To assure accuracy and stability, the shaft 136 is pinned as at 140 and 141 to the associated pillow block caps 142.

The body member 130 of the turret assembly carries four identical work supporting mandrel assemblies 146, positioned at 90° intervals around its circumference. Each of the mandrels comprises a shaft 148, the enlarged main body portion of which is rotatably supported in precision pre-loaded bearings 150, 152 and 154 received in a cylindrical recess 156 in the turret body 130. A spacer 157 separates the bearings 152 and 154. The outer race of the outer bearing 150 is clamped by a retaining ring 158 engaging a flat surface 160 machined to provide a locating surface at a predetermined distance from the center of the turret shaft 136.

The headed end 162 of the mandrel shaft 148 is held tightly against the inner race of the inner bearing 154 by a lock nut 164 threaded onto the projecting portion of the shaft and engaging the inner race of the outer bearing 150. The workpiece W is supported on a reduced cylindrical portion 168 of the mandrel, the juncture between this reduced portion and the adjacent relatively enlarged portion 170 forming an annular work locating shoulder 172 which is located precisely with respect to the turret axis. In practice the location of the shoulder 172 is such as to dispose the axial midpoint of the workpiece exactly in alignment with the axial midpoint of the dies. This is necessary to assure correct formation of the workpiece. To assure that the workpiece will be retained on the mandrel as the turret rotates, an O-ring 174 is provided in the work supporting section 168 of the mandrel. When the workpiece is loaded onto the mandrel in the manner described below, the O-ring is lightly compressed and frictionally holds the workpiece in place during the turret movement. During the rolling operation, however, the workpiece is held firmly against the shoulder 172 under substantial pressure by the workpiece drive and support assembly 64 which will now be described in detail.

As stated above the entire assembly 64 is movable laterally with the apparatus with the base plate 66. It is also capable of independent movement in a direction parallel with the axis of the dies and the workpiece. For this purpose a slide member 180 is mounted for sliding movement on the turret casting 114 in a direction parallel with axis of the workpiece by a precision ball bearing support 179 guided in suitable ways provided in the main turret casting 114. The bearings and associated ways are of conventional construction. The position of the slidable base 180 is controlled by a hydraulic cylinder assembly 181 carried by a support block 182 mounted on the turret casting 114. The projecting piston rod 183 of the cylinder 181 is threaded into the adjacent end of the slide block 180. A carefully machined spacer 189 is positioned between the upper surface of the slide block 180 and the lower surface of the main mounting block 190 and is securely bolted to each of these members.

A pair of control rods 184 and 185 carried by a block 186 on the spacer 189 extend rearwardly for engagement with micro switches 187 and 188 to control the operation of the cylinder 181 and control the stroke of the assembly 64.

The mounting block 190 has a through cylindrical bore 192 for the reception of a bearing assembly comprising bearings 194, 196 and 198 and a spacer sleeve 200 for rotatably supporting the shaft 202 of the mandrel support assembly. The outer races of the bearings are held between a retainer ring 204 and a retainer plate 206 and the inner race of the bearings are held between a shoulder 208 and a lock nut 210 threaded onto the projecting end of the shaft 202.

At its forward projecting end the shaft 202 is provided with a cylindrical socket 212 which receives the projecting end of the turret mandrel 148 with a close clearance fit, the outer end of the socket and the outer end of the mandrel 148 being chamfered to facilitate the insertion of the latter into the former. The outer end of the socket 212 is carefully machined to provide an annular shoulder 214 which engages a side face of the workpiece and forces it against the locating shoulder 172 during the rolling operation. Also, to facilitate relative axial movement of the mandrel 148 and the shaft 202 the socket 212 is vented by one or more axial grooves 216 leading to flats 218 on the shaft 202.

The assembly 64 not only locates and supports the workpiece during the rolling operation but is effective to rotate the workpiece at a speed which substantially matches the speed of the dies before it is engaged by the dies. In prior rolling operations the workpiece is rotated solely by the dies and initial engagement of the rotating dies with a stationary workpiece may result in marking of the workpiece which is acceptable for most production work but is unacceptable for high precision work of the type for which the subject apparatus was specifically developed.

The drive mechanism for the shaft 202 comprises an extensible drive shaft 220 rotatably supported at its rearward end in a bearing assembly 221 mounted on the bed 20 and connected by a suitable coupling 224 at its forward end to an intermediate shaft 226 supported for rotation coaxially of the shaft 202 on a pair of pillow blocks 228 and 230 mounted on base 232 carried by opposed upstanding support flanges 234 and 236 bolted to the base plate 66. The shaft 220 is driven in synchronism with the dies 22 and 24 by a chain drive 238 connected to the die drive transmission 52. At its forward end the shaft 226 is provided with a tongue 242 slidably extending into a slot 244 in a fitting 246 loosely connected by bolts 248 and an annular clamp 250 to three brake shoe members 252, 254 and 256 positioned in surrounding relation to the reduced end portion 258 of the shaft 202. The inner surfaces of the brake shoe members are provided with conical notches as at 260 for the reception of a series of three balls 262 which extend through radial bores 264 leading into a recess 266 formed in the end portion 258 of the mandrel. The balls 262 are positioned by a central control ball 268 in the recess 266. The ball 268 is urged to the left as viewed in FIG. 5A, to urge the balls 262 radially outwardly, by a spring 270, the effective force of which is controlled by a rod 272 extending through a central through bore 274 in the mandrel 202. The axial position of the rod 272 is controlled by an adjusting nut 276 threaded into the tapped outer end of the bore 274.

In practice, the slip clutch is so adjusted that the shoe members 252, 254 and 256 are urged radially outward against the cylindrcial surface of the clamp 250 with only the relatively low force required to assure rapid acceleration of the shaft 202, the workpiece and mandrel 148 to rolling speed. However, if either of the dies meets the workpiece with tooth to tooth engagement, the clutch assembly slips to permit the instantaneous acceleration or deceleration of the workpiece to assure proper engagement of the dies and the workpiece without imposing substantial loads on the workpiece.

The upper portion of the mounting block 190 also provides passages for lubricant and coolant and provides a locating surface for a set-up instrument (not shown).

A further feature of the present invention of particular importance is a mechanism for loading work blanks onto the turret and removing finished workpieces from the turret during the interval required to roll a workpiece. Accordingly, the mechanism reduces the time required for loading and unloading to zero.

Figure 5B:
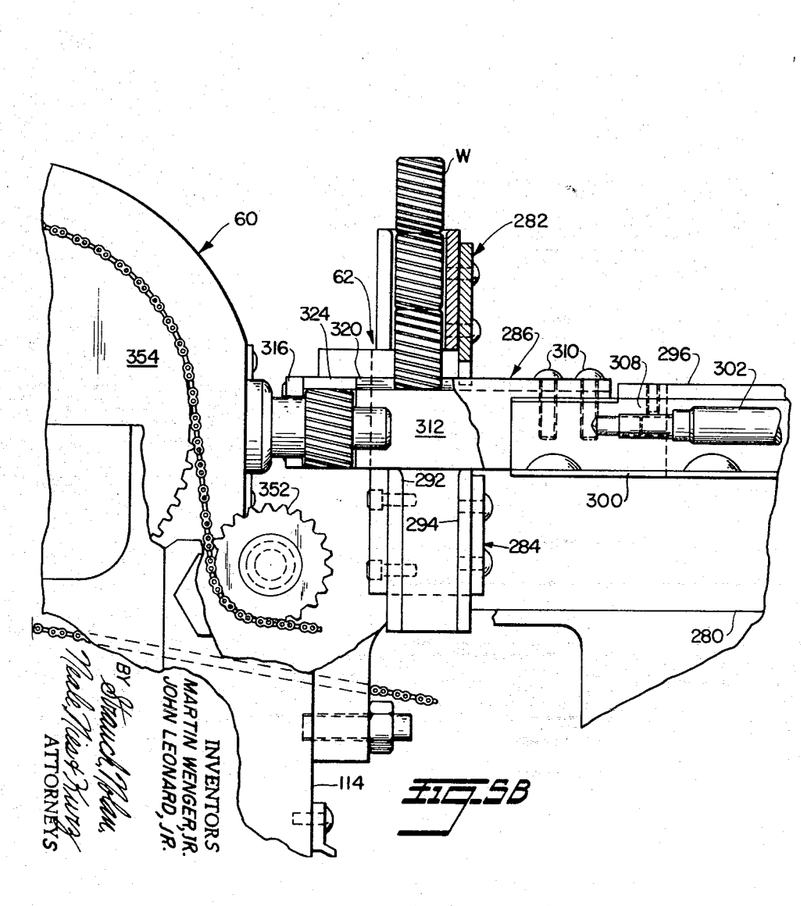
FIG. 5B is a continuation of FIG. 5A.

The loading and unloading mechanism illustrated particularly in FIGS. 4 and 5B is supported on a main casting 280 bolted to the front wall of the main turret casting 114. The loading and unloading apparatus includes an upper chute assembly 282 for the reception of incoming work blanks, a lower chute assembly 284 for the delivery of finished workpieces, and a loading and control assembly 286 interposed between the chute assemblies 282 and 284. The upper chute is of generally rectangular form dimensioned in accordance with the dimensions of the workpiece and is supported by flanged support members 288 and 290 on the upper surface of the arms of the support casting 280. The lower chute assembly 284, which is similarly dimensioned is bolted to the underside of flanged support members 288 and 290 and is so positioned as to dispose its front and rear walls 292 and 294 in offset relation to the corresponding walls of the upper chute section. The assembly 286 comprises a main U-shaped transfer member 296 guided for sliding movement in a direction normal to the axis of the turret in nylon ways 298 and 300 bolted to the upper face of the support casting 280. The transfer member 296 is reciprocated by the piston rod 302 of the hydraulic cylinder 304 supported on an end plate 306 bolted to the support casting 280. The piston rod 302 is adjustably connected to the base of the transfer assembly 296 as at 308. Secured as by bolts 310 to the inner end of the transfer assembly 296 are a pair of spaced arms 312 and 314 which extend between the upper and lower chutes in close clearance relation with the bottom of the former and the top of the latter. Attached to the ends of the arms 312 and 314 are a pair of inwardly projecting fingers 316 and 318, respectively, the spacing between the adjacent faces of which is slightly greater than the outer diameter of the shoulder 172 on the mandrel 148. Along the main portion of their length the upper edges of the adjacent surfaces of the arms are provided with chamfered work support surfaces 320 and 322, the spacing between these surfaces being slightly greater than the diameter of the end portion of the mandrel and substantially less than the diameter of the work blanks. At their outer ends the arms 312 and 314 are cut away as at 324 and 326 to provide, with the fingers 316 and 318, a recess having a width slightly greater than the diameter of the workpiece and a length slightly greater than the width of the workpiece.

It will be noted that the vertical height of the arm members 312 and 314 is slightly greater than the diameter of the workpiece and the arms are located vertically so as to dispose their horizontal center line on the axis of the turret assembly. In operation to be described in detail below the loading and unloading assembly is effective to remove a finished workpiece from the mandrel and replace it with a work blank for subsequent transfer to the working station. It will be appreciated that the transfer member 296 is automatically advanced and retracted in timed relation with the remainder of the apparatus. The movement of the transfer member is controlled by a pair of micro switches 328 and 330 actuated by respective cams 332 and 334 carried by the upper surface of the transfer member adjacent its rearward end.

The turret assembly is driven in timed relation with the remainder of the mechanism by a hydraulic motor 340 carried by a mounting plate 342 suitably secured to the under surface of the support casting 280. The output shaft of the motor 340 is coupled to a cross shaft 344 supported in a bearing block 346 bolted to the casting 280. The shaft 344 carries a sprocket 348 driving a chain 350 which passes over an idler pulley 352 and then passes around a drive sprocket 354 rotatably supported by bearing 356 on the turret shaft 136. The sprocket 354 is resiliently connected to the turret body 130 by two identical connector assemblies 357 (one shown). Each of the connector assemblies comprises a cylindrical body 358 secured by a screw 360 to the sprocket 354, the cylindrical member 358 fitting into a cylindrical recess in the turret body 130 with a substantial clearance. An O-ring 362 received in a groove in the body in the cylindrical member 358 is received with an interference fit between the body member and the surrounding recess to provide a resilient drive connection between the parts. The head of a bolt 366 bears against the bottom of a recess 368 in the head body 130, the bolt extending through an oversized opening 370 in the cylindrical member 358 to hold the parts against relative movement axially of the turret shaft 136. The resilient connection provides an essentially positive drive and yet permits any slight rotary displacement of the turret assembly with respect to the sprocket necessary to permit the proper reception of the end of the mandrel 148 into the socket provided in the end of the shaft 202.

The diameter of the sprocket 354 is four times the diameter of the sprocket 348. Accordingly, the motor 340 and the associated shaft 344 complete one revolution to index the turret assembly 90°. The motor 340 is started and stopped and operated at the desired speeds by conventional valves which control the flow of hydraulic fluid to the motor. The hydraulic circuit and the valving arangement per se are wholly conventional and need not be described further here. The valves are under the control of limit switches 372 and 374 suitably supported on a plate 376 bolted to the support casting 280. The limit switches are operated by a pair of arms 378 and 380, respectively, adjustably secured to the outer end of the shaft 344. The hydraulic control circuit for the motor 340 is so arranged that it initially rotates at a relatively high speed to advance the turret rapidly to a point just short of its final index position. At this point the arm 380 closes the switch 374 to operate a valve (not shown) which substantially reduces the speed of the motor. When the final index position is reached the arm 378 closes the switch 372 to stop the motor to position the primary mandrel 148 in direct alignment with the shaft 202.

In the operation of the machine, circumstances may arise which make it undesirable to use one or more of the turret mandrels. A unique control system is provided to prevent the loading of that mandrel and to prevent the initiation of a rolling operation when the mandrel subsequently reaches the rolling station. This mechanism includes a Geneva wheel 392 rotatably supported on a shaft 384 supported in a bearing block 386 bolted to the mounting plate 342. Two diametrical slots 388 and 390 are milled across the face of the wheel 382 for the reception of a roller 392 carried by an arm 394 rotatable with a shaft 344. By virtue of this arrangement each rotation of the shaft 344 produces a quarter revolution of the wheel 382, the motion of which thus corresponds to the motion of the turret assembly. Formed in the periphery of the wheel 382 are four tapped openings 396 into which headed screws 398 may be inserted. If the screws are not installed in the openings 396 the operation of the wheel 382 has no effect on the mechanism. However, if one mandrel becomes unsuitable for use one of the screws is installed in the opening 396 which corresponds in position to the position of the disabled mandrel.

In the operation of the machine, when screw 398 reaches the position shown, the defective mandrel will reach the rolling station. In this position the screw 398 will actuate switch 400 which is so connected in the control system as to prevent the initiation of a rolling operation. Accordingly, the turret and the wheel 382 will be immediately indexed to the next rotated position upon the completion of the loading of the mandrel opposite the defective mandrel. When the mechanism is again indexed to dispose the defective mandrel assembly at the loading station the screw 398 will contact the limit switch 402 which is so connected in the control circuit as to prevent the operation of the loading and unloading mechanism. Thus, the defective mandrel will continue to be indexed from position to position empty and the time loss incident to the presence of the defective mandrel will be minimized.

The overall operation of the mechanism will now be described.

As stated above, the subject apparatus is particularly useful in finish rolling gears, such as automotive transmission gears, which must be produced in large quantities to close tolerances.

In a typical case, the workpiece operated on by the apparatus is an embryo helical gear having peripheral teeth formed to full depth by a hobbing machine. As produced by the hobbing machine the gear teeth have an unacceptable finish and incorporate unacceptable dimensional inaccuracies in lead and in tooth form. The hobbed workpiece, however, has a central bore and end faces which are finished to close tolerances and which may thus serve as locating surfaces to permit positioning of the workpiece during the final rolling operation.

The mechanism is initially adjusted with conventional apparatus and techniques to position the dies 22 and 24 in the proper relative axial and rotated position and the turret 60 is adjusted to dispose the axis of one mandrel in a plane containing the axes of the dies.

The upper chute section 282, which in practice is vertically elongated and connected to an automatic loading apparatus, is filled with workpieces. Workpieces are also positioned manually on each of the turret mandrels.

The apparatus is then placed in operation by manipulation of the usual controls normally provided in such mechanisms.

Figure 1:
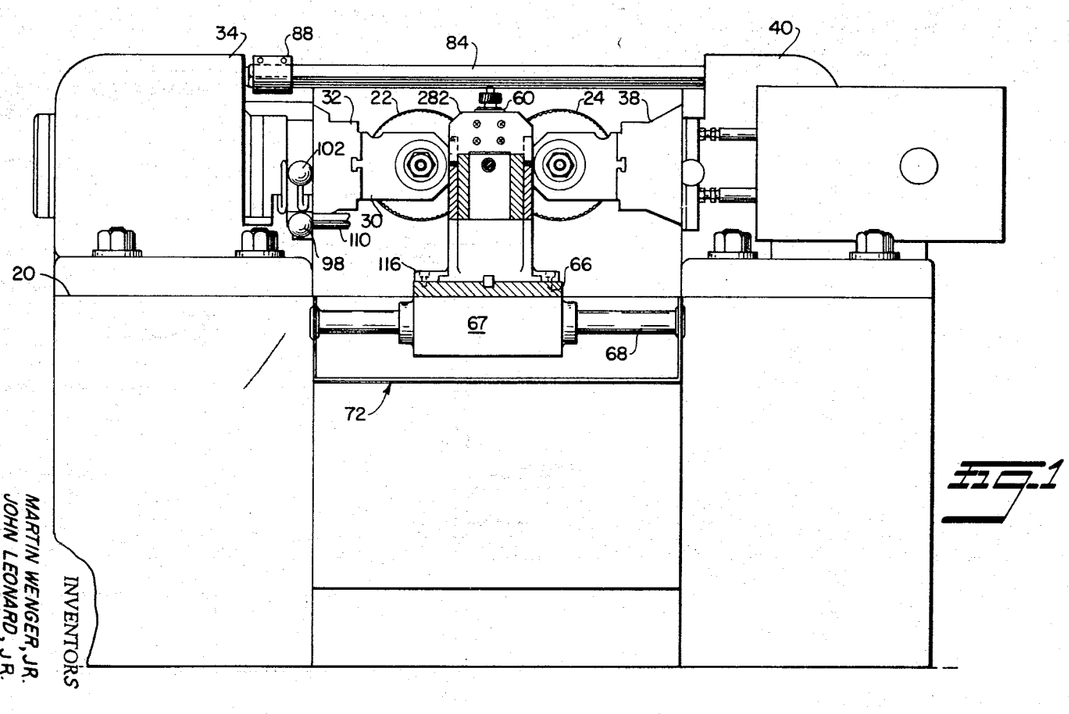
FIG. 1 is a front elevation of a rolling apparatus constructed in accordance with the present invention with certain components removed for clarity.

All components of the mechanism will then occupy the position shown in the drawings except that the die 24 will be withdrawn to the right as viewed in FIG. 1 and the turret assembly 60, the support drive assembly 64, the loading apparatus 62 and all other parts carried by the base plate 66 will also be displaced to the right.

Then, as the cycle progresses, the die 24 will be advanced to the left as viewed in FIG. 1 and through the action of the level mechanism 84, 110 etc. described above, the assemblies 60, 62 and 64 will be displaced to the left an amount equal to half the displacement of the die 24. The effect of the level mechanism 84, 110 etc. is to maintain the axis of the workpiece midway between the axes of the dies 22 and 24 at all times.

During the rolling operation the axis of the workpiece is maintained in the plane of the axis of the dies which is essential to the accurate formation of the teeth on the workpiece. The face of the socket 212 also holds the workpiece tightly against the shoulder 172 on the mandrel under moderate pressure thus assuring that the workpiece is exactly centered axially with respect to the dies 22 and 24, which again is essential for the successful formation of workpieces of this type to close tolerances.

The pre-rotation of the workpiece by the drive assembly 64 and its positive lateral displacement by the lever mechanism 84, 110 cooperate to eliminate lateral or radial loads on the teeth of the workpiece to eliminate the possibility of nicking or marking the tooth surfaces, thus assuring that production of the requisite finish on the workpiece. The total cycle time which elapses between the initial advancement of the die 24 and its return to its initial position takes, in a typical case, about two or three seconds.

As soon as the die 24 has withdrawn and the turret assembly has been displaced sufficiently so that the workpiece is clear of both the dies, the support and drive assembly 64 is retracted and the turret assembly is indexed 90° in a clockwise direction as viewed in FIGS. 3 and 5A to dispose the finished workpiece on a vertically projecting upper mandrel and the next workpiece to be finished at the rolling station between the dies 22 and 24. The support and drive assembly 64 is again advanced to the position shown in FIG. 5A to position and rotate the workpiece and the cycle is repeated.

In the next succeeding index movement of the turret the originally finished workpiece is positioned at the loading station as shown in FIG. 5B. As soon as the workpiece reaches this position, the hydraulic cylinder 304 is operated to move the transfer assembly 296 to the right, the fingers 316 and 318 engaging the inner surface of the workpiece to withdraw the workpiece from the mandrel. In the initial movement of the transfer the workpieces in the upper chute 282 are supported on the chamfered surfaces 320 and 322. As the movement of the transfer assembly continues to the right, the finished workpiece is positioned under the lowermost one of the incoming workpieces on the upper chute assembly 282. Ultimately, the finished workpiece reaches a position in registry with the lower chute 284 and drops into this chute for delivery to a conveyor or container. The lowermost of the incoming workpieces then drops into the recess provided by the cutaway portions 324 and 326 on the arms 312 and 314 but is prevented from dropping into the lower chute 284 because of the offset relation between the upper and lower chute sections 282 and 284.

The transfer assembly then moves to the left carrying with it the workpiece and in the subsequent movement of the transfer assembly the unfinished workpiece is moved into the same position as the position from which the finished workpiece was moved. In this movement of the transfer assembly, the next incoming workpiece drops down the chute 282 and is supported on the chamfered surfaces 320 and 322. Thus, the mechanism is effective in a single push-pull motion to remove a finished workpiece from the mandrel, deposit it in the delivery chute, receive a new workpiece from the incoming chute and position it on the mandrel. It is to be particularly noted that the loading and unloading operation is accomplished while the workpiece is being rolled on the mandrel opposite to the mandrel at the loading station. Thus, the total cycle time of the machine is dictated by the time required for rolling and no additional time is required for loading or unloading the apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. For use in workpiece rolling apparatus of the infeed type in which workpieces are formed at a rolling station between a pair of rotatable dies, one of which is mounted for displacement toward and away from the other die to form the workpiece and thereafter permit the replacement of the finished workpiece by a workpiece to be formed, a workpiece support assembly comprising a primary support member adapted to engage a finished locating surface on a workpiece and a secondary work support member adapted to engage a second locating surface on said workpiece, said first and second members interengaging and providing a straddle support for said workpiece, means mounting said assembly for movement in the same direction as said one die, and means operatively connecting said one die and said assembly and operable to displace said assembly with said one die as said one die is moved toward and away from said other die, the displacement of said workpiece support assembly being related to the displacement of said one die to move the workpiece to its rolling position as said one die is displaced toward said other die and thereafter move said workpiece to a position out of contact with both dies as said die is moved away from said other die, the displacement of said workpiece being less than the displacement of said one die.

2. The combination according to claim 1 together with means for rotating at least one of said work support members to thereby rotate said workpiece in timed relation with the rotation of said dies at least until one of said dies engages the workpiece.

3. Apparatus for rolling a workpiece at a rolling station between a pair of rotatable dies, at least one of which is mounted on a support for displacement toward and away from the other die, means for supporting the workpiece at said rolling station comprising a turret, at least one pair of rotatable workpiece supporting members carried by said turret, said members being positioned to dispose one member at said rolling station when the other member is at a loading station, transfer means at said loading station for replacing a finished workpiece on a member with an unfinished workpiece, and means for intermittently indexing said turret to simultaneously advance a member from said loading station toward said rolling station and another member from said rolling station toward said loading station.

4. The combination according to claim 3 wherein said transfer means comprises a transfer assembly positioned between a loading chute adapted to receive incoming unfinished workpieces and a discharge chute for receiving finished workpieces, means for moving said transfer assembly through a loading stroke and an unloading stroke, said transfer assembly being operable in said loading stroke to carry a finished workpiece from said loading chute to said member and operable in said unloading stroke to carry a finished workpiece from said member to said discharge chute.

5. Apparatus for supporting a centrally apertured workpiece at a working station between opposed rotating dies comprising a rotatable turret, a plurality of rotatable primary work support members on said turret adapted to project into the aperture in said workpiece, a secondary work support member adjacent to said working station, said primary and secondary work support members cooperating to straddle support said workpiece, and means to rotate at least one of said work support members to thereby rotate said workpiece independently of the rotation imparted to said workpiece by said dies.

6. The apparatus according to claim 5 together with means for intermittently indexing said turret to dispose successive ones of said work support members at said working station, and means to move said secondary work support member away from supporting relation with to said turret to provide a yieldable drive connection 7. The combination according to claim 5 together with drive means for intermittently indexing said turret to dispose successive ones of said primary work support members at said working station comprising a motor drivingly connected to a sprocket, and yieldable means mounting said sprocket on said turret to permit limited circumferential movement of said sprocket with respect to said turret to provide a yieldable drive connection between said motor and said turret.

8. The combination according to claim 5 together with a locating surface on said primary work support members adapted to engage a side face of said workpiece, said secondary work support member having a surface adapted to engage the opposite side face of said workpiece to hold said workpiece in engagement with said locating surface.

9. Apparatus for loading and unloading centrally apertured workpieces on a workpiece supporting member comprising means providing upper and lower chute sections through which workpieces pass by gravity and said upper and lower chute sections being disposed above and below said member, respectively, a transfer assembly positioned between said chute sections, and means for moving said transfer assembly through an advance stroke and a retract stroke, said transfer assembly being operable in said retract stroke to carry a finished workpiece from said work supporting member to said lower chute section and operable, in said advance stroke, to carry an unfinished workpiece from said upper chute section to said work support member.

10. Apparatus for loading and unloading centrally apertured workpieces on a workpiece supporting member comprising means providing feeding and discharge paths through which workpieces pass, said paths leading to and from said member, respectively, a transfer assembly positioned at the junction of said paths, and means for moving said transfer assembly through a loading stroke and an unloading stroke, said transfer assembly being operable, in said loading stroke, to carry an unfinished workpiece from said feeding path and deposit said workpiece on said work support member and operable in said retract stroke to remove a finished workpiece from said work support member and deliver said finished workpiece to said discharge path.

11. Apparatus for the infeed type for rolling a workpiece at a rolling station between a pair of rotatable dies, one of which is mounted on a support for displacement toward the other die to roll said workpiece and away from said other die to permit the replacement of a finished workpiece with a workpiece to be formed, means for supporting a workpiece between said dies comprising a workpiece support assembly, means mounting said assembly for movement in the same direction as said one die, and means operatively connecting said support and said assembly and operable to displace said assembly with said one die as said one die is moved toward and away from said other die, the displacement of said assembly being related to but less than the displacement of said one die to move said workpiece toward said rolling station as said one die is displaced toward said other die and to move said workpiece to a position out of contact with both dies as said one die is moved away from the other die, and means for rotating said workpiece in timed relation with the rotation of said dies at least during a portion of the displacement of said one die toward said other die.

References Cited

UNITED STATES PATENTS

| | | | |
|---|---|---|---|
| 2,627,767 | 2/1953 | Batchelder | 72—101 |
| 3,299,680 | 1/1967 | Thompson | 72—102 X |
| 3,362,059 | 1/1968 | Di Ponio et al. | 29—159.2 |

MILTON S. MEHR, Primary Examiner

U.S. Cl. X.R.

29—159.2; 72—421

UNITED STATES PATENT OFFICE
CERTIFICATE OF CORRECTION

Patent No. 3,533,258  Dated October 13, 1970

Inventor(s) J. E. Leonard, Jr., et al

It is certified that error appears in the above-identified patent and that said Letters Patent are hereby corrected as shown below:

Col. 12, line 31, change "to said turret to provide a yieldable drive connection" to --said workpiece during said indexing movements.--

SIGNED AND SEALED
DEC 22 1970

(SEAL)
Attest:

Edward M. Fletcher, Jr.
Attesting Officer

WILLIAM E. SCHUYLER, JR.
Commissioner of Patents